United States Patent
Parsons et al.

(10) Patent No.: US 12,420,535 B2
(45) Date of Patent: Sep. 23, 2025

(54) SYNTHETIC PAPER WITH IMPROVED TEAR PROPERTIES AND METHODS OF MANUFACTURING

(71) Applicant: Ampacet Corporation, Tarrytown, NY (US)

(72) Inventors: Mark Parsons, Terre Haute, IN (US); Danny Nevins, Terre Haute, IN (US); Doug Brownfield, Mason, OH (US)

(73) Assignee: AMPACET CORPORATION, Tarrytown, NY (US)

( * ) Notice: Subject to any disclaimer, the term of this patent is extended or adjusted under 35 U.S.C. 154(b) by 0 days.

(21) Appl. No.: 15/812,276

(22) Filed: Nov. 14, 2017

(65) Prior Publication Data
US 2018/0134014 A1    May 17, 2018

Related U.S. Application Data

(60) Provisional application No. 62/421,641, filed on Nov. 14, 2016.

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/20* (2013.01); *B32B 27/32* (2013.01); *C08K 3/26* (2013.01);
(Continued)

(58) Field of Classification Search
CPC ......... B32B 27/306; B32B 7/02; B32B 27/20; B32B 27/32; B32B 27/308; B32B 5/16; B32B 23/04; B32B 27/327; B32B 27/36; B32B 27/08; B32B 27/18; B32B 29/005; B32B 27/325; B32B 5/30; B32B 2264/12; B32B 2255/26; B32B 2307/5825; B32B 2255/20; B32B 2439/70; B32B 2255/04;
(Continued)

(56) References Cited

U.S. PATENT DOCUMENTS 3,922,427 A    11/1975  Toyoda et al.
5,128,183 A     7/1992  Buzio
(Continued)

FOREIGN PATENT DOCUMENTS

AR    110085 A1    2/2019
AR    110484 A1    4/2019
(Continued)

OTHER PUBLICATIONS

International Preliminary Report on Patentability in the corresponding international application mailed May 29, 2019; 8 pages.
(Continued)

*Primary Examiner* — Samir Shah
(74) *Attorney, Agent, or Firm* — Smith, Gambrell & Russell, LLP

(57) ABSTRACT

Synthetic paper that includes at least one resin layer formed from a composition including a polymeric resin and a low aspect ratio filler, a tear additive, or both. The present invention also relates to methods for making the synthetic paper. The synthetic paper has the texture and appearance of tissue paper.

11 Claims, 6 Drawing Sheets

(51) Int. Cl.
  *B32B 27/32* (2006.01)
  *C08K 3/26* (2006.01)
  *C08L 23/06* (2006.01)

(52) U.S. Cl.
  CPC ........... *C08L 23/06* (2013.01); *B32B 2250/02* (2013.01); *B32B 2250/03* (2013.01); *B32B 2323/043* (2013.01); *B32B 2323/046* (2013.01); *C08K 2003/265* (2013.01); *C08K 2201/005* (2013.01)

(58) Field of Classification Search
  CPC .......... B32B 2323/046; B32B 2250/04; B32B 2255/12; B32B 2270/00; B32B 2250/26; B32B 2451/00; B32B 2264/10; B32B 2264/104; B32B 2307/41; B32B 2272/00; B32B 2307/7244; B32B 2439/46; B32B 2307/732; B32B 2323/043; B32B 2264/102; B32B 2264/105; B32B 2250/02; B32B 2250/03; B32B 2250/05; B32B 2255/10; B32B 2307/7246; C08K 3/26; C08K 2201/005; C08K 2003/265; C08L 23/06; C08L 23/04
  See application file for complete search history.

(56) References Cited

U.S. PATENT DOCUMENTS

| | | | |
|---|---|---|---|
| 5,667,872 | A | 9/1997 | Ohno et al. |
| 7,041,243 | B2 | 5/2006 | Lin |
| 7,108,908 | B2 | 9/2006 | Ishige et al. |
| 7,144,635 | B2 | 12/2006 | Hawes et al. |
| 7,776,413 | B2 | 8/2010 | Ochiai et al. |
| 10,011,063 | B2 | 7/2018 | Lehrter et al. |
| 2005/0048271 | A1* | 3/2005 | Iwasa .................. B32B 7/06 428/195.1 |
| 2005/0214486 | A1 | 9/2005 | Ochiai et al. |
| 2006/0199030 | A1* | 9/2006 | Liang .................. C08F 10/00 428/515 |
| 2010/0204379 | A1 | 8/2010 | Pira |
| 2015/0072131 | A1* | 3/2015 | Lehrter ............... B29C 67/20 428/220 |
| 2015/0370182 | A1* | 12/2015 | Ikarashi ............. G03G 7/004 428/327 |

FOREIGN PATENT DOCUMENTS

| | | | |
|---|---|---|---|
| BR | 112019009621 | A2 | 8/2019 |
| CA | 3043603 | A1 | 5/2018 |
| CN | 1643042 | A | 7/2005 |
| CN | 1684999 | A | 10/2005 |
| CN | 101410459 | A | 4/2009 |
| CN | 103108616 | A | 5/2013 |
| CN | 110121536 | A | 8/2019 |
| EA | 201991187 | A1 | 10/2019 |
| EP | 1486528 | A1 | 12/2004 |
| EP | 1537991 | A1 | 6/2005 |
| EP | 3538612 | A1 | 9/2019 |
| GB | 1384556 | | 2/1975 |
| IL | 266536 | | 7/2019 |
| JP | 2001-055451 | | 2/2001 |
| JP | 2001-055451 | A | 2/2001 |
| JP | 2003-026866 | | 1/2003 |
| JP | 2003-026866 | A | 1/2003 |
| JP | 2003-034760 | | 2/2003 |
| JP | 2003-034760 | A | 2/2003 |
| JP | 2003-127133 | | 5/2003 |
| JP | 2003-127133 | A | 5/2003 |
| JP | 2003341242 | * | 12/2003 |
| JP | 2005199514 | | 7/2005 |
| JP | 2015151649 | * | 8/2015 |
| JP | 2019-536867 | A | 12/2019 |
| KR | 2019-0079673 | A | 7/2019 |
| WO | 94/06849 | A1 | 3/1994 |
| WO | 02102593 | A1 | 12/2002 |
| WO | 2007/015120 | A1 | 2/2007 |
| WO | 2018/089999 | A1 | 5/2018 |

OTHER PUBLICATIONS

Written Opinion and Search Report of the Intellectual Property Office of Singapore, mailed Apr. 15, 2020 (9 pages).
Office action received in corresponding application PID201904004, delivered on Mar. 2, 2021. 4 pages (2 pages of English Translation, 2 pages of Original Document).
First Examination Report received in Indian Application IN201917021685, mailed on Jan. 29, 2021, 6 pages.
Office Action received for AR Application No. 20170103390, mailed on Nov. 17, 2020, 6 pages (2 pages of English Translation and 4 pages of Original Document).
Office action received in corresponding application EA201991187, delivered on Feb. 3, 2021. 8 pages (4 pages of English Translation, 4 pages of Original Document).
Hearing Notice received Indian application IN 201917021685, issued Jun. 4, 2021 (2 pages).
Notice of Reasons for Rejection received in Japanese application JP 2019- 525007, issued on Aug. 25, 2021 (6 pages of English Translation, 6 pages of Original Document).
Office Action received in Argentine application AR 20170103390, issued on May 18, 2021 (1 page of English Translation, 4 pages of Original Document).
Written Opinion received in Brazilian application BR 112019009621, issued Aug. 13, 2021 (4 pages of Original Document, 2 pages of English Translation).
Office action received in corresponding application CN201780076377. 7, issued on Apr. 23, 2021, 16 pages (8 pages of English Translation, 8 pages of Original Document).
Search Report received for Chinese Patent Application No. 201780076377, mailed on Nov. 10, 2020, 2 pages.
Notification of Grounds for Refusal received in Korean application 10-2019-7016677, issued Aug. 30, 2021 (10 pages of English Translation, 8 pages of Original Document).
Official Action received in Ukraine application a201906625, issued Sep. 7, 2021 (3 pages of English Translation, 3 pages of Original Document).
Official Action received in Eurasian application 201991187, issued Oct. 14, 2021 (3 pages of English Translation, 3 pages of Original Document).
Notice of Reasons for Rejection received in Japanese Application No. 2019-525007, issued on Feb. 9, 2022 (3 pages of Translation, 3 pages of Original Document).
Official Notice received in Israeli Application No. 266536, issued on Apr. 3, 2022 (5 pages).
Notification of Substantive Examination received in corresponding Vietnamese Application No. 1-2019-03163, dated Sep. 23, 2022 (2 pages of Translation, 2 pages of Original Document).
Communication Pursuant to Article 94(3) received in corresponding European Application EP 17869144.0, dated Oct. 28, 2022 (3 pages).
International Search Report and Written Opinion received for PCT Patent Application No. PCT/US2017/061535, mailed on Feb. 5, 2018, 8 pages.
Extended European Search Report issued by the European Patent Office on Mar. 13, 2020 (10 pages).
Official Action received in Eurasian Application No. 201991187, mailed May 19, 2022 (4 pages of Translation, 2 pages of Original Document).
First Substantive Examination Report received in Saudi Arabian Application No. 519401778, mailed Apr. 24, 2022 (5 pages).
Final Notice of Grounds for Preliminary Rejection received in Korean Application No. 10-2019-7016677, mailed Apr. 25, 2022 (3 pages of Translation, 3 pages of Original Document).
Office Action received Apr. 24, 2024 in Mexican Patent Application No. MX/a/2019/005624 (4 pages in Spanish, 4 pages English translation).

(56) References Cited

OTHER PUBLICATIONS

Office Action received Apr. 3, 2024 in Canadian Patent Application No. 3,043,603 (3 pages).
Communication pursuant to Article 94(3) EPC received Mar. 30, 2023 in European Patent Application No. 17869144.0 (5 pages).
Communication pursuant to Article 94(3) EPC received Sep. 26, 2023 in European Patent Application No. 17869144.0 (4 pages).
Official Action received in Eurasian Patent Application No. 201991187, mailed Jun. 26, 2020 (3 pages in Russian, 4 pages English translation).
Official Action received in Chinese Patent Application No. 201780076377.7, mailed Dec. 23, 2020 (9 pages in Chinese; 11 pages English Translation).

* cited by examiner

SYNTHETIC PAPER WITH IMPROVED TEAR PROPERTIES AND METHODS OF MANUFACTURING

FIELD OF THE INVENTION

The present invention relates to synthetic paper, and more particularly to synthetic paper that includes at least one resin layer formed from a composition including a polymeric resin and a low aspect ratio filler, a tear additive, or both, having tear and fold properties like paper. The present invention also relates to methods for making the synthetic paper.

BACKGROUND OF THE INVENTION

The research and technological developments on synthetic paper have been focused on the production of a film or sheet capable of being printed and written by a number of inks, including the aqueous inks, from virgin plastic resins. The surface proprieties of at least one of the sides of the film are adequate to be printed or written, by means of the variation of components types and concentration, kind of surface treatment, or even by means of application of different surface coatings. The mechanical and optical proprieties are also qualitatively and quantitatively described, where the film rigidity, opacity, and density are taken into account when producing synthetic paper or film for printing, with balanced proprieties.

For example, U.S. Pat. No. 5,128,183 generally describes a biaxially oriented film including a blend of high density polypropylene and isotactic polyethylene, and at least 15 percent by weight of an amorphous, glassy, low molecular weight resin (such as pine resins and saturated terpenes) to improve twist retention.

However, production of synthetic paper to meet these needs has left a void in synthetic papers that can be used for package wrapping, such as gift, floral, and food, and other packaging applications, since synthetic paper to date lacks the ability to fold and tear like paper. For example, synthetic papers to date are typically coated to achieve desired moisture resistance and odor resistance. In addition, synthetic paper developed to date has poor dead fold properties, i.e., the material lacks the ability to maintain the desired angle of a fold and not to "spring back." Moreover, the synthetic papers developed to date are difficult, if not impossible, to tear without being first cut and will distort when stretched.

As such, there remains a need in the art for a synthetic paper used as a food wrap that reduces or eliminates grease stains and prevents the migration of chemicals and waxes into foods. In addition, there is a need in the art for synthetic papers with a tissue paper-like feel that can be used for a variety of applications, maintain folds, and be easily torn in multiple directions with minimal to no distortion.

SUMMARY OF THE INVENTION

Disclosed are methods and compositions related to synthetic paper-like films with the look and feel of tissue paper. In one aspect, the present invention relates to synthetic paper including one or more layers of a resin film where the resin film includes a continuous olefin resin matrix having calcium carbonate ($CaCO_3$) uniformly dispersed therein, In one embodiment, the particle size of $CaCO_3$ is at least 20 µm. In another embodiment, the synthetic paper has a tissue paper-like texture and appearance. For example, the synthetic paper can be torn without stretching or distorting the paper or cutting the paper to start the tear.

The present invention is directed to a synthetic paper including one or more layers of a resin film formed from a composition including: a polyolefin resin present in an amount of about 40 percent to about 60 percent by weight of the synthetic paper; and a particulate filler having a mean particle size of about 10 µm to about 30 µm, wherein the synthetic paper has a dead fold angle of about 20° to about 30°. In one embodiment, the polyolefin resin includes low density polyethylene, linear low density polyethylene, high density polyethylene, or a mixture thereof. In another embodiment, the particulate filler is present in the composition in an amount of 10% to 40% by weight. In yet another embodiment, the particulate filler includes calcium carbonate.

The synthetic paper may include at least two resin layers. In one embodiment, the synthetic paper includes at least three resin layers. In another embodiment, the synthetic paper has a thickness of about 0.5 mils to about 4 mils. In still another embodiment, the composition includes a cyclic olefin co-polymer.

The present invention is also directed to a synthetic paper including one or more layers of a resin film formed from a composition including: a polyolefin resin present in an amount of about 40 percent to about 60 percent by weight of the synthetic paper; a particulate filler having a mean particle size of about 10 µm to about 30 µm; and a cyclic olefin copolymer, wherein the synthetic paper has an Elmendorf tear strength of about 100 mN to about 1000 mN in a transverse direction. In one embodiment, the synthetic paper has a dead fold angle of about 20° to about 30°. In another embodiment, the synthetic paper has an Elmendorf tear strength of about 50 mN to about 750 mN in a machine direction. In yet another embodiment, the particulate filler is present in the composition in an amount of about 10 percent to about 40 percent by weight. In still another embodiment, the particulate filler includes calcium carbonate. Moreover, the synthetic paper may include at least two layers. In this aspect, the at least two layers may include a first layer and a second layer, wherein the polyolefin resin in the first layer is different from the polyolefin in the second layer. The cyclic olefin copolymer may be present in an amount of about 2 percent to about 10 percent by weight of the composition.

The present invention also relates to a synthetic paper including a resin film layer formed from a composition including: a polyolefin resin present in an amount of about 40 percent to about 60 percent by weight of the synthetic paper, wherein the polyolefin resin includes low density polyethylene; and a cyclic olefin copolymer present in an amount of about 2 percent to about 10 percent by weight of the composition, wherein the synthetic paper has an Elmendorf tear strength of about 500 mN to about 1500 mN in a transverse direction. In one embodiment, the synthetic paper has an Elmendorf tear strength of about 500 mN to about 1500 mN in a machine direction. In another embodiment, the synthetic paper has a thickness of about 0.5 mils to about 4 mils. In yet another embodiment, the cyclic olefin copolymer is present in an amount of about 5 percent to about 10 percent by weight of the composition.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
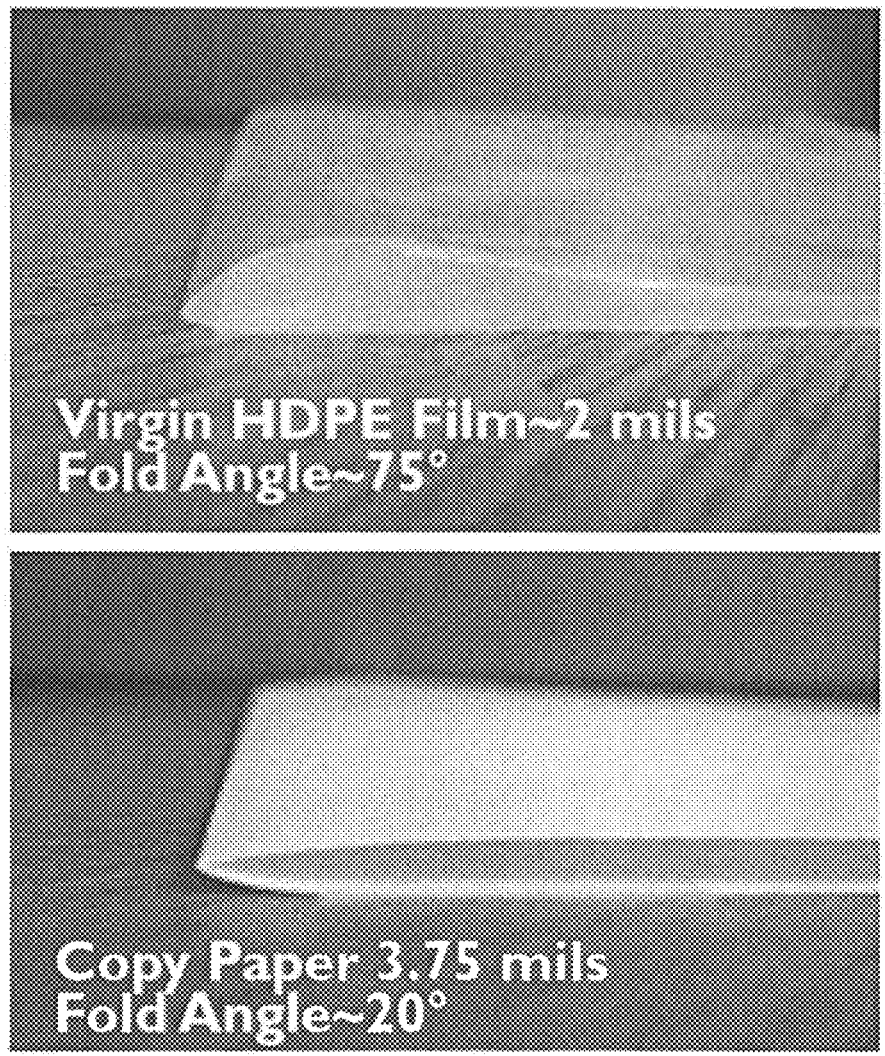
FIG. 1 shows the dead fold angle of virgin HDPE film and paper.
Figure 2:
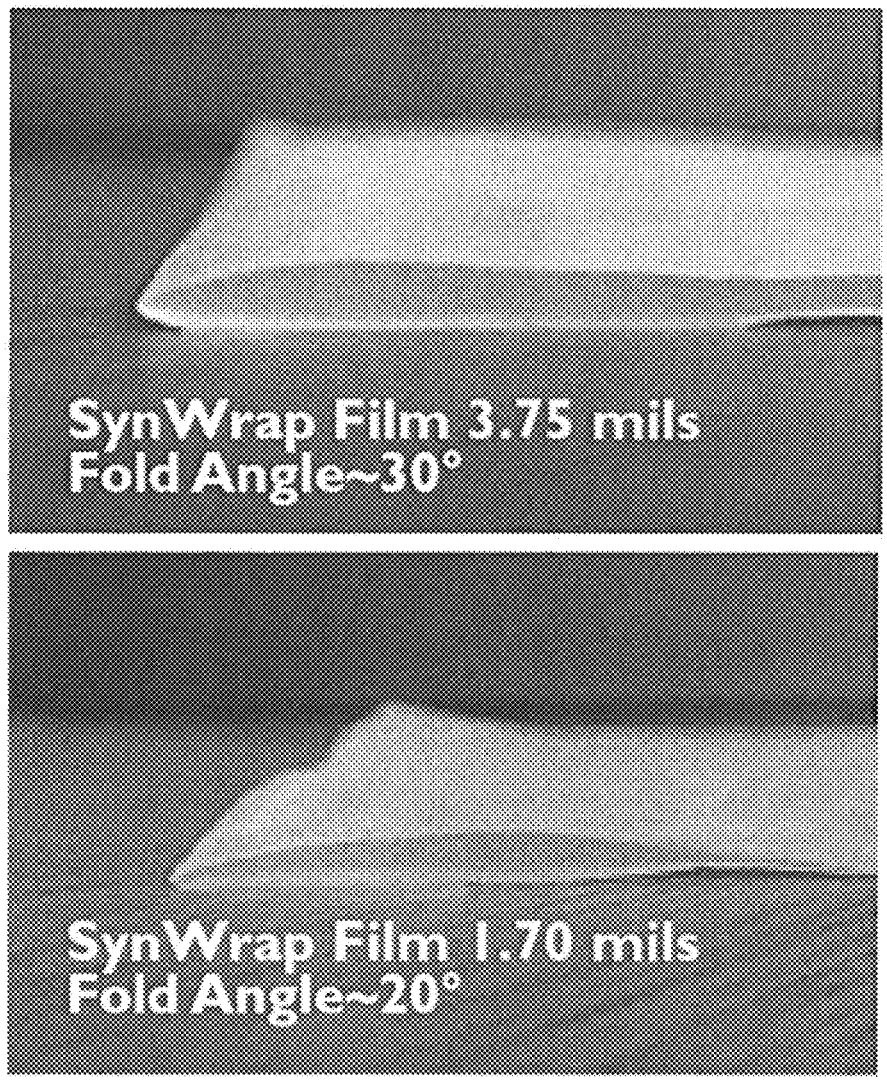
FIG. 2 shows the dead fold angle of different thicknesses of the synthetic paper made according to an embodiment of the invention.

Before the present compounds, compositions, articles, devices, and/or methods are disclosed and described, it is to be understood that they are not limited to specific synthetic methods unless otherwise specified, or to particular components unless otherwise specified, as such may, of course, vary. It is also to be understood that the terminology used herein is for the purpose of describing particular embodiments only and is not intended to be limiting.

Definitions

As used in the specification and the appended claims, the singular forms "a," "an" and "the" include plural referents unless the context clearly dictates otherwise. Thus, for example, reference to "a polymeric resin" includes mixtures of two or more such polymeric resins, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to and 15 are considered disclosed as well as between 10 and 15. It is also understood that each unit between two particular units are also disclosed. For example, if 10 and 15 are disclosed, then 11, 12, 13, and 14 are also disclosed.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

The Resin Film Compositions

As briefly disclosed above, the synthetic paper of the present invention may include one or more layers of a resin film. In one embodiment, the resin film used to form the synthetic paper is formed from a composition that includes a polymeric resin and a low aspect ratio filler. In another aspect, the resin film used to form the synthetic paper is formed from a composition that includes a polymeric resin, a low aspect ratio filler, and a tear additive. In yet another aspect, the resin film used to form the synthetic paper is formed from a composition that includes a polymeric film and a tear additive. Other additives, discussed in more detail below may also be included in any of the compositions outlined above. Each component of the compositions used to form the resin film that ultimately becomes the synthetic paper of the present invention is discussed in more detail below. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular embodiment of the synthetic paper of the present invention is disclosed and discussed and a number of modifications that can be made are discussed, it is specifically contemplated that each and every combination and permutation of synthetic paper and the modifications that are possible unless specifically indicated to the contrary. Thus, if components A, B, and C are disclosed as well as components D, E, and F, and an example of a composition including A-D is discussed, then even if each is not individually recited, each is individually and collectively contemplated, e.g., compositions including A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

Polymeric Resin

The composition includes a polymeric resin. Suitable resins for use in the present invention include, but are not limited to, polyolefins. In one embodiment, the polyolefin may include low density polyethylene (LDPE), linear low density polyethylene (LLDPE), high density polyethylene (HDPE), medium density polyethylene (MDPE), very low density polyethylene (VLDPE), high molecular weight polyethylene (HMWPE), ultra high molecular weight polyethylene (UHMWPE), ultra low molecular weight polyethylene (ULMWPE or PE-WAX), cross-linked polyethylene (PEX or XLPE), high density cross-linked polyethylene (HDXLPE), and combinations thereof. The term polyethylene means ethylene homopolymers or copolymers made of ethylene and at least one other olefin monomer. In addition, polypropylene (PP) polymers, low density polypropylene (LDPP), high density polypropylene (HDPP), and combinations thereof are suitable for use as the polyolefin. In one embodiment, the polyolefin is ethylene vinyl acetate (EVA) copolymer. In another embodiment, the polyolefin is a metallocene catalyzed polyolefin (i.e., plastomer) resin. Combinations of polyethylene polyolefins, polypropylene polyolefins, EVA copolymer, and plastomers are contemplated for use as the polymeric resin. For example, mixtures or blends of low density polyethylene (LDPE), with or without other polymer materials, may be used. In addition, mixtures or blends of high density polyethylene (HDPE), with or without other polymer materials, may be used.

The polymeric resins of the present invention may either be homopolymers or copolymers. In one embodiment, the polymeric resin is an olefin-copolymer. Non-limiting examples of olefin copolymers include polyethylene butylacrylate, polyethylene methacrylate, polyethylene vinyl acetate, and combinations thereof.

In one aspect, the polymeric resin is a low density polyethylene (LDPE). The LDPE may have a density ranging from about 0.910 g/cm$^3$ to about 0.940 g/cm$^3$. In another aspect, the polymeric resin is a linear low density polyethylene (LLDPE). The LLDPE may have a density ranging from about 0.915 g/cm$^3$ to about 0.925 g/cm$^3$.

In still another aspect, polymeric resin is high density polypropylene (HDPE). The density of the HDPE may be from about 0.940 g/cm3 to about 0.960 g/cm3 and, in one embodiment, is greater than about 0.941 g/cm3. The HDPE may have a molecular weight of at least about 200,000. In one embodiment, the molecular weight of the HDPE is between about 200,000 and 3,000,000. In another embodiment, the HDPE has a molecular weight of at least about 500,000. In another embodiment, the HDPE has a molecular weight of at least about 750,000. For example, the HDPE may have a molecular weight ranging from about 1,000,000 to about 1,500,000. In yet another embodiment, the HDPE has a molecular weight of less than about 2,000,000.

In yet another aspect, the polymeric resin is a very low density polyethylene (VLDPE). The density of the VLDPE is between about 0.880 g/cm3 and about 0.915 g/cm3. In still another aspect, the polymeric resin is a medium density polyethylene (MDPE). The density of the MDPE is between about 0.926 g/cm3 and about 0.940 g/cm3.

In another aspect, the polymeric resin is a recycled or biodegradable polyolefin resins. For example, the polymeric resin may be a polyolefin resin constructed from bioplastics derived from renewable raw materials or plastics made from petrochemicals containing biodegradable additives that enhance biodegradation. In one embodiment, the polymeric resin includes polyolefin resins made from aromatic polyesters (e.g., polyhydroxyalkanoates (PHAs) such as the poly-3-hydroxybutyrate (PHB), polyhydroxyvalerate (PHV), and polyhydroxyhexanoate (PHH), polylactic acid (PLA), polybutylene succinate (PBS), and polycaprolactone (PCL)); polyanhydrides; polyvinyl alcohol, start derivatives; or cellulose esters.

The polymeric resin may be included in the resin composition in an amount from about 20 percent to about 90 percent by weight of the composition. In on embodiment, the polymeric resin is present in the composition in an amount from about 30 percent to about 80 percent by weight of the composition. In another embodiment, the composition includes about 50 percent to about 80 percent of the polymeric resin, by weight of the composition. In yet another embodiment, the polymeric resin is present in the composition in an amount from about 60 percent to about 80 percent by weight of the composition. In still another embodiment, the composition includes about 40 percent to about 60 percent of the polymeric resin, by weight of the composition.

In one embodiment, the polymeric resin is polyethylene-based and includes about 40 to about 60 percent by weight of the composition. For example, the composition may include about 45 percent to about 55 percent of LDPE, LLDPE, or combinations thereof by weight of the composition.

Low Aspect Ratio Filler

In one aspect, the composition of the invention also includes a low aspect ratio filler material. When included in the composition, suitable low aspect ratio fillers include, but are not limited to, alkali metal and alkaline earth metal carbonates, sulphates and phosphates, and mixtures thereof. In one embodiment, the low aspect ratio filler material includes calcium carbonate, sodium carbonate, barium sulphate, calcium sulphate, sodium sulphate, sodium phosphate, potassium phosphate, calcium phosphate, and mixtures thereof. Other low aspect ratio fillers are also contemplated, e.g., talc, silica, mica, and the like. In one embodiment, the low aspect ratio filler includes calcium carbonate (CaCO$_3$).

It is understood and herein contemplated that the particle size of the low aspect ratio filler has an effect on the properties of the resulting film. It is also understood and contemplated that a low aspect ratio filler may have particles therein that are diverse in size. As such, the mean particle size (or average particle size) is used to define the low aspect ratio filler described herein. The size of the particles in the low aspect ratio filler may be determined according to ASTM E2651-10, Standard Guide for Powder Particle Size Analysis. In another embodiment, the mean particle size of the low aspect ratio filler is at least about 10 microns. For example, the mean particle size of the low aspect ratio filler may range from about 10 microns to about 30 microns. In yet another embodiment, the low aspect ratio filler has a mean particle size from about 12 microns to about 21 microns. In particular, the low aspect ratio filler may have a mean particle size of about 12 microns, about 17 microns, about 21 microns, or other specific sizes within the range of about 12 microns to about 21 microns.

In yet another embodiment, the mean particle size of the low aspect ratio filler is at least about 18 microns. In this aspect, the low aspect ratio filler may have a mean particle size of from about 18 to about 50 microns. For example, the mean particle size of the low aspect ratio filler may range from about 20 to about 40 microns, about 20 to about 30 microns, or other ranges therebetween. In one embodiment, the mean particle size of the low aspect ratio filler is The low aspect ratio filler may be included in the composition in an amount of about 10 percent to about 80 percent by weight of the composition. In one embodiment, the composition includes about 20 percent about 60 percent of the low aspect ratio filler by weight of the composition. In another embodiment, the composition includes about 20 percent to about 50 percent of the low aspect ratio filler by weight of the composition. In yet another embodiment, the low aspect ratio filler is included in the composition in an amount of about 20 percent to about 40 percent by weight of the composition. However, other ranges of the low aspect ratio filler are contemplated for use in the present invention depending on the amounts of the other components included in the composition. For example, the low aspect ratio filler may be included in an amount of about percent to about 70 percent, about 10 percent to about 50 percent, and about 10 percent to about 40 percent by weight of the composition.

For example, the composition may include a polymeric resin including polyethylene, such as LDPE or LLDPE, and a low aspect ratio filler, such as $CaCO_3$. In this aspect, the polymeric resin may be present in the composition in an amount of about 40 percent to about 60 percent by weight of the composition and the low aspect ratio filler may uniformly dispersed in the composition in an amount of about 20 percent to about 40 percent by weight of the composition. In one embodiment, the resin film is formed from a composition that includes about 45 percent to about 55 percent LDPE or LLDPE and about 30 percent to about 40 percent $CaCO_3$. In this aspect, the $CaCO_3$ may have a mean particle size from about 12 microns to about 21 microns.

Tear Additive

When the composition of the invention includes the tear additive, suitable non-limiting examples of the tear additive include block copolymers, alternating polymers, stereoblock copolymers, and combinations thereof. For example, the tear additive may be a branched (e.g., star, brush, or comb) or linear copolymer. In one embodiment, the copolymer can be a copolymer of poly(lactide), a poly(glycolide), a poly(lactide-co-glycolide), a poly(caprolactone), a poly(orthoester), a poly(phosphazene), a poly(hydroxybutyrate) a copolymer containing a poly(hydroxybutarate), a poly(lactide-co-caprolactone), a polycarbonate, a polyesteramide, a polyanhydride, a poly(dioxanone), a poly(alkylene alkylate), a copolymer of polyethylene glycol and a polyorthoester, a biodegradable polyurethane, a poly(amino acid), a polyamide, a polyesteramide, a polyetherester, a polyacetal, a polycyanoacrylate, a poly(oxyethylene)/poly(oxypropylene) copolymer, polyacetals, polyketals, polyphosphoesters, polyhydroxyvalerates or a copolymer containing a polyhydroxyvalerate, polyalkylene oxalates, polyalkylene succinates, poly(maleic acid), or combinations thereof. In one aspect, the copolymer can be can be poly(lactide), 95:5 poly(lactide-co-glycolide) 85:15 poly(lactide-co-glycolide), 75:25 poly(lactide-co-glycolide), 65:35 poly(lactide-co-glycolide), 50:50 poly(lactide-co-glycolide), or combinations thereof, where the ratios are mole ratios.

In one embodiment, the resin film is formed from a composition that includes a polymeric resin, a low aspect ratio filler, and a tear additive, where the tear additive includes a block copolymer, alternating polymer, stereoblock copolymer, or a combination thereof. In another embodiment, the low aspect ratio filler includes calcium carbonate (CaCO3) and is uniformly dispersed in the composition. In yet another embodiment, the resin film is formed from a composition that includes a polymeric resin and a tear additive, where the tear additive includes a block copolymer, alternating polymer, stereoblock copolymer, or a combination thereof.

The tear additive may also be a cyclic olefin copolymer ("COC"). As understood by those of ordinary skill in the art, COCs may be produced by copolymerization of ethylene with a cyclic olefin monomer. In this regard, the cyclic olefin monomers may be derivatives of cyclopentadiene or dicyclopentadiene. In one embodiment, the cyclic olefin monomers include norbornene, dihydrodicyclopentadiene, phenyl norbornene, tetracyclododecene, or combinations thereof. The COC to be used as the tear additive may also be produced by ring-opening metathesis polymerization of various cyclic monomers followed by hydrogenation (cyclic olefin polymers). In one aspect, the COC may be a chain copolymerization of cyclic monomers such as 8,9,10-trinorbom-2-ene (norbornene) or 1,2,3,4,4a,5,8,8a-octahydro-1,4:5,8-dimethanonaphthalene (tetracyclododecene) with ethane. In one embodiment, the tear additive may be a COC of ethylene and norbonene. In another embodiment, the COC is a 5:95, 10:80, 15:85, 20:80, 25:75, 30:70, 35:65, 40:60, 45:55, 50:50, 55:45, 60:40, 65:35, 70:30, 75:25, 80:20, 85:15, 90:10, or 95:5 molar ratio of ethylene and norbornene.

As such, in one embodiment, the resin film is formed from a composition that includes a polymeric resin, a low aspect ratio filler, and a tear additive, where the tear additive includes a COC. In another embodiment, the low aspect ratio filler includes calcium carbonate ($CaCO_3$) and is uniformly dispersed in the composition. In yet another embodiment, the resin film is formed from a composition that includes a polymeric resin and a tear additive, where the tear additive includes a COC.

The tear additive may be present in the composition in an amount of about 1 percent to about 20 percent by weight of the composition. In one embodiment, the tear additive may be present in the composition in an amount of about 2 percent to about 15 percent by weight of the composition. In another embodiment, the tear additive may be present in the composition in an amount of about 2 percent to about 10 percent by weight of the composition. In yet another embodiment, the composition includes about 5 percent to about 10 percent of the tear additive, by weight of the composition.

Other Additives

The compositions of the invention may also include "special effect agents." Special effect agents refers to any agent that can create a visual effect including, but not limited to, colored pigments, pearlescent pigments, light interference pigments, matte additives, or other special effect pigments. Special effect agents may be included in the composition in amounts ranging from about 1 percent to about 30 percent by weight of the composition depending on the particular desired result of the additive. For example, the special effect agent may be included in an amount of about 5 percent to about 25 percent by weight of the composition. In one embodiment, the compositions of the invention include a matte additive in an amount of about percent to about 25 percent by weight of the composition. In another embodiment, a colored pigment is included in the compositions of the invention in an amount of about 5 percent to about 10 percent by weight of the composition. In yet another embodiment, the compositions of the invention include a pearlescent pigment in an amount of about 5 percent to about 20 percent by weight of the composition.

The compositions of the invention may also include functional additives such as antistatic agents, anti-fog agents, flame retardants, desiccants, antioxidants, oxygen scavengers, ultraviolet inhibitors, moisture blockers, and combinations thereof. Suitable non-limiting examples of antistatic additives include fatty acid esters of polyethylene glycol, such as glycerol monostearate, whether present in a mixture or not with ethoxylated amines and alkyl amines or fatty acid amides, such as stearamide, with the possibility of being mixed with sliding additives, such as erucamide amides and oleamide.

As would be understood by those of ordinary skill in the art, antistatic agents are generally available in migratory and non-migratory chemistries. Both are independently contemplated for use in the compositions of the present invention. For example, in one embodiment, the antistatic agent is present in a migratory masterbatch such that the antistatic properties take affect when the final polymer is formed. More specifically, the low molecular weight antistatic agent begins to migrate to the polymer's surface to form a microscopically thin coating at which point the coating actively captures water vapor from the air. The captured water, in turn, becomes the conductor to dissipate static electricity. Should the antistatic agent present on the surface be wiped away through use, more of the antistatic agent migrates out of the polymer to replace it. Such anti-static agents may include amines or be amine-free depending on the end use of the synthetic paper. For example, antistatic agents including amines are not recommended for use for electronics packaging or packaging that includes or has contact with polycarbonates. When present, the amine may comprise about 1 percent to about 5 percent by weight of the antistatic agent. In another embodiment, the antistatic agent is present in a non-migratory masterbatch. Such a masterbatch is independent of atmospheric humidity and provides antistatic properties to the composition (and ultimately the synthetic paper) by forming static electricity percolating networks. In other words, without being bound by any particular theory, the agent itself is conductive and, if present in a sufficient amount, electricity can tunnel through the polymer providing that the gaps between the agent and the non-conductive polymer are of a size that allows such a tunneling effect.

Suitable non-limiting examples of antioxidants for use with the present invention include phenol-, aromatic amine-, sulfate-, mercaptan-, phosphite-, benzophenone- and its derivatives-, benzotriazol-, sterically obstructed amine-, salicylic acid-, chromo- and manganese salt-, phosphorus compound-based compounds, and combinations thereof.

Functional additives may be included in the composition in amounts ranging from about 1 percent to about 40 percent by weight of the composition depending on the particular desired result of the additive. For example, these types of additives may be included in an amount of about 2 percent to about 30 percent by weight of the composition. In one embodiment, the compositions of the invention include at least one desiccant in an amount of about 5 percent to about 30 percent by weight of the composition. In another embodiment, an antioxidant is included in the compositions of the invention in an amount of about 2 percent to about 5 percent by weight of the composition. In yet another embodiment, the compositions of the invention include an oxygen scavenger in an amount of about 5 percent to about 20 percent by weight of the composition. In still another embodiment, an ultraviolet inhibitor is included in the compositions of the invention in an amount of about 2 percent to about 5 percent by weight of the composition. In yet another embodiment, the compositions of the invention include at least one moisture blocker in an amount of about 2 percent to about 20 percent by weight of the composition. Anti-fog agents, and flame retardants may each be included in the compositions of the invention in an amount of about 2 percent to about 5 percent by weight of the composition. Migratory antistatic agents may be included in the compositions of the invention in an amount of about 1 percent to about 8 percent by weight of the composition. In one embodiment, the composition includes about 2 percent to about 4 percent by weight of a migratory antistatic agent. In another embodiment, the composition includes about 1 percent to about 5 percent by weight of a migratory antistatic agent. In yet another embodiment, the composition includes about 5 percent to about 8 percent by weight of a migratory antistatic agent. Non-migratory antistatic agents may be included in the compositions of the invention in an amount of about 15 percent to about 40 percent by weight of the composition.

Compatibilizer agents may also be included in the compositions of the invention. Suitable compatibilizer agents include, but are not limited to diblock SB styrene-butadiene copolymers, triblocks SBS or star and linear multiblocks or "graphitized" (grafted), multiblocks SB hydrogenated copolymers such as styrene-ethylene-butylene-styrene (SEBS), graphitized copolymers of polypropylene and polyethylene with styrene (S) or maleic anhydrous (MAH), such as PP-g-S, PP-g-MAH, PE-g-S, PE-g-MAH, and combinations thereof. When included compatibilizer agents may be included in an amount of about 1 percent to about 10 percent by weight of the composition. In one embodiment, a compatibilizer agent is included in the composition of the invention in an amount of about 2 percent to about 5 percent by weight of the composition.

When the compositions of the invention do not include a low aspect ratio filler, i.e., the composition includes a polymeric resin and a tear additive but no low aspect ratio filler, antiblockage additives may be employed to prevent the film from sticking together. In this aspect, suitable antiblockage additives useful in the such compositions include, but are not limited to, porous and non-porous synthetic sylic with or without surface treatment, silicates, thin spheres of poly (methyl methacrylate) and silicone with the possibility of being mixed with sliding additives, such as erucamide amides and oleamide, or present in a mixture with fatty acid amides, such as stearamide. In one embodiment, the composition of the invention includes at least one antiblockage additive in an amount of about 1 percent to about 5 percent by weight of the composition. When present, the sliding additive is present in an amount of about 1 percent to about 5 percent by weight of the composition.

Methods of Making the Synthetic Paper

While in its simplest form, the synthetic paper of the present invention is formed from a single layer of resin film, where the resin film is formed from a composition of the invention. However, it is fully contemplated that the synthetic paper includes multiple layers of resin film. For example, the synthetic paper may include at least two layers. In one embodiment, the synthetic paper includes at least three layers. In another embodiment, the synthetic paper includes more than four layers. Indeed, the synthetic paper may include 1, 2, 3, 4, 5, 6, 7, 8, 9, 10, 11, 12, 13, 14, 15, 16, 17, 18, 29, 20, 25, 30, 35, 40, 45, or 50 or more layers.

Because the synthetic paper may include multiple layers of the resin film, it is understood that that the polymeric composition forming each layer may contribute to the visual and textural effects given to synthetic paper as well as the other physical attributes of the film given the intended use of the film. Accordingly, the composition used to form each layer of the synthetic paper is independent and can be different or the same as any one or more additional layers. In one aspect, each layer of the synthetic paper can include the same or different polyolefin resins. In one embodiment, the synthetic paper includes a plurality of layers where the compositions used to form each layer all include the same polymeric resin. In another embodiment, the synthetic paper includes a plurality of layers where the compositions used to form each layer all include different polymeric resins. In yet another embodiment, the synthetic paper includes a plurality of layers where at least one layer is formed from a composition that uses a different polymeric resin than the polymeric resin included in the composition used to form the other layer(s). For example, the synthetic paper may include at least two layers where a first layer is formed from a composition that includes low density polyethylene (LDPE) and a second layer is formed from a composition that includes linear low density polyethylene (LLDPE), high density polyethylene (HDPE), or any of other polymeric resins described above.

It is understood and herein contemplated that the individual layers of the synthetic paper may include the same or different composition and that the ratio of individual layers may be modified to achieve different visual effects. For example, when the synthetic paper includes two layers, each layer may comprise about 50 percent by weight of the synthetic paper. Alternatively, when the synthetic paper includes two layers, each layer may comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 percent by weight of the synthetic paper while the remaining layer includes the remaining percentage of the synthetic paper. Similarly, when the synthetic paper includes three layers, each layer may comprise the same portion (i.e., a ⅓ portion) of the weight of the synthetic paper or be differently proportioned such that at most two of the layers comprise the same amount while the remaining layer includes a different weight percentage of the overall weight of the synthetic paper or all three layers comprise different weight percentages of the overall weight of the synthetic paper. For example, it is contemplated that the first (i.e., the outer) layer and the third layer (i.e., innermost layer) may each comprise 20 percent by weight of the synthetic paper (a total of 40 percent) while the second (middle or core layer) includes the remaining 60 percent of the overall weight of the synthetic paper. In this aspect, any combination of layer weight ratios can exist in the synthetic paper, including, but not limited to, an outer:middle:inner percentage of 5:90:5; 10:80:10; 15:70:15; 20:60:20; 25:50:25; 30:40:30; 35:30:35; 40:20:40; 45:10:45; 5:5:90; 10:10:80; 15:15:70; 20:20:60; 25:25:50; 30:30:40; 35:35:30; 40:40:20; 45:45:10; 90:5:5; 80:10:10; 70:15:15; 60:20:20; 50:25:25; 40:30:30; 30:35:35; 20:40:40; 10:45:45; 5:10:85; 10:15:75; 15:20:65; 20:25:55; 25:30:45; 10:5:85; 15:10:75; 20:15:65; 25:20:55; 30:25:45; 85:10:5; 75:15:10; 65:20:15; 55:25:20; 45:30:25; 85:5:10; 75:10:15; 65:15:20; 55:20:25; 45:25:30; 5:85:10; 10:75:15; 15:65:20; 20:55:25; 25:45:30; 10:85:5; 15:75:10; 20:65:15; 25:55:20; or 30:45:25 or any other combination.

It is understood and herein contemplated that the relative compositions used for building multiple layers of synthetic paper mainly vary with the application and type of layer, i.e., outer, inner, or core. For example, the middle or core layer may be composed of about 40 percent to about 80 percent polyolefin resin, 20 percent to about 40 percent low aspect ratio filler, and about 1 percent to about 20 percent tear additive. In addition, one layer may include a tear additive and another layer may not.

As discussed previously, a special effect agent is an agent that can create a visual effect. As such, special effect agents may be used in a synthetic paper including a single layer of resin film. In addition, if the resin film includes multiple layers, special effect agents can be incorporated into any layer of the multilayered polymeric film. For example, in one embodiment, the synthetic paper of the present invention includes at least two layers of resin film where both layers include a composition of the invention that has a special effect agent dispersed therein. In another embodiment, the synthetic paper of the present invention may include more than two layers, e.g., three layers, where each of the second and third layers is formed from a composition including a special effect agent. In yet another embodiment, the synthetic paper of the present invention includes three layers, where each of the layers is formed from a composition including a special effect agent. In this aspect, the special effect agent included in each layer may be the same or different.

The synthetic paper can be any thickness needed given the desired application. Thickness can be determined by the number of layers and/or the thickness of the one or more individual layers. In one aspect, the thickness of the synthetic paper can be generally in the range of about 0.5 mils to about 4.0 mils. In one embodiment, the synthetic paper may have a thickness of about 0.5 mils to about 3.0 mils. In another embodiment, the synthetic paper may have a thickness of about 0.5 mils to about 2.0 mils. If the synthetic paper includes multiple layers, the thickness of each layer may be the same or different. For example, if the synthetic paper has an overall thickness of about 1.0 mil but includes multiple layers, the thickness of each layer may be about 0.5 mils. Alternatively, if the synthetic paper has an overall thickness of about 2.0 mils but includes multiple layers, the thickness of the first layer may be about 1.5 mils and the thickness of the second layer may be about 0.5 mils.

If the synthetic paper includes more than one layer, each layer may account for 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 percent of the total thickness of the synthetic paper while the remaining layers includes the remaining percentage of the synthetic paper.

In one embodiment, the synthetic paper includes at least two layers where the first layer accounts for about 20 percent to about 40 percent of the total thickness of the synthetic paper and the second layer accounts for about 60 percent to about 80 percent of the total thickness of the synthetic paper. In another embodiment, the first layer accounts for about 10 percent to about 20 percent of the total thickness of the synthetic paper and the second layer accounts for about 80 percent to about 90 percent of the total thickness of the synthetic paper. In still another embodiment, the first layer accounts for about 30 percent to about 50 percent of the total thickness of the synthetic paper and the second layer accounts for about 50 percent to about 70 percent of the total thickness of the synthetic paper.

The synthetic paper may be produced with blown or cast extrusion processes. The order and method of mixing the components in the compositions used to prepare the films of the present invention is not critical. In one embodiment, the components can be combined simultaneously.

The synthetic papers of the present invention may also be treated with a glossy surface treatment or hazy surface treatment, depending on the intended end use. For example, both water borne coatings and non-water borne coatings can be used to coat the synthetic papers of the present invention. The formulation of water borne coating may include acrylic resin, isopropanol, polyvinyl alcohol, clays, an anti-static agent, 28 percent aqueous ammonia, pure water, and vinyl acetate.

In addition, the synthetic papers of the present invention have a surface that will accept most common printing methods and ink systems. As such, it is contemplated that flexography, gravure, letterpress, screen or offset presses will be used to print line work or multi-color process on the synthetic papers of the present invention.

Properties of the Synthetic Paper
Dead Fold Properties

Without being bound to any particular theory, it is believed that the use of a low aspect ratio filler in the compositions of the invention improve the dead fold properties of the resulting synthetic paper. "Dead fold" refers to the synthetic paper's ability to retain a fold or crease. Typically, materials with superior dead fold properties include metal foils, paper, polystyrene and PVC. A conventional test for dead fold property may be conducted by making a 180° fold in the material at ambient temperature and then measuring the angle to which the fold opens after a period of time. Lower or smaller angles are desirable since this indicates greater dead fold retention. For the purposes of this disclosure, a dead fold angle is intended to refer to the angle of the fold after a period of about five minutes.

As shown in FIG. 1, virgin HDPE film with a thickness of 2 mils has a dead fold angle of about 75° after five minutes. In comparison, a piece of copy paper with a thickness of about 3.75 mils has a dead fold angle of about 20° after five minutes. The synthetic papers of the present invention exhibit improved dead fold properties over virgin polyethylene film and comparable dead fold properties to copy paper. More specifically, the synthetic paper of the present invention may have a dead fold angle after five minutes of about 50° or less. In one embodiment, the dead fold angle of the synthetic paper of the present invention after a period of five minutes is about 10° to about 40°. In another embodiment, the synthetic paper of the present invention has a dead fold angle after five minutes of about 20° to about 30°.

Tear Properties

Without being bound by any particular theory, it is believed that the use of a tear additive in the compositions of the invention results in synthetic paper that allows for the paper to be torn with minimal or no stretching of the synthetic paper without the need for a priming cut. In this regard, the tear strength can be adjusted by adjusting the let-down ratio of the tear additive in the composition (i.e., the weight percent of tear additive by weight of the total composition). In one embodiment, the Elmendorf Tear Strength (ASTM D1922) ranges from about 50 mN to about 4000 mN in the transverse direction. As used herein, transverse direction means a direction perpendicular to the direction of working. In another embodiment, the Elmendorf Tear Strength ranges from about 100 mN to about 3500 mN in the transverse direction. In yet another embodiment, the Elmendorf Tear Strength ranges from about 100 mN to about 1900 mN in the transverse direction. For example, when formed using LDPE, the synthetic paper of the present invention may have an Elmendorf Tear Strength ranging from about 100 mN to about 1500 mN in the transverse direction. In one embodiment, when formed using LDPE, the synthetic paper of the present invention may have an Elmendorf Tear Strength ranging from about 100 mN to about 500 mN in the transverse direction. In another embodiment, when formed using HDPE, the synthetic paper of the present invention may have an Elmendorf Tear Strength ranging from about 50 mN to about 800 mN in the transverse direction. In another embodiment, when formed using HDPE, the synthetic paper of the present invention may have an Elmendorf Tear Strength ranging from about 100 mN to about 600 mN in the transverse direction.

The Elmendorf Tear Strength (ASTM D1922) ranges from about 50 mN to about 3500 mN in the machine direction. As used herein, machine direction means a direction parallel to the direction of working. In another embodiment, the Elmendorf Tear Strength ranges from about 100 mN to about 2000 mN in the machine direction. In yet another embodiment, the Elmendorf Tear Strength ranges from about 100 mN to about 1000 mN in the machine direction. For example, when formed using LDPE, the synthetic paper of the present invention may have an Elmendorf Tear Strength ranging from about 50 mN to about 1500 mN in the machine direction. In one embodiment, when formed using LDPE, the synthetic paper of the present invention may have an Elmendorf Tear Strength ranging from about 50 mN to about 500 mN in the machine direction. In another embodiment, when formed using HDPE, the synthetic paper of the present invention may have an Elmendorf Tear Strength ranging from about 50 mN to about 400 mN in the machine direction. In another embodiment, when formed using HDPE, the synthetic paper of the present invention may have an Elmendorf Tear Strength ranging from about 50 mN to about 150 mN in the machine direction.

The tear properties of the synthetic paper of the present invention may also be measured in comparison to virgin film. For example, when compared to virgin LLDPE film, the synthetic paper of the present invention may have a drop in Elmendorf Tear Strength of at least about 5 percent in the transverse direction and at least about 10 percent in the machine direction. In one embodiment, in the transverse direction, the Elmendorf Tear Strength of the synthetic paper of the present invention is about 95 percent to about 45 percent of the Elmendorf Tear Strength of virgin LLDPE film. In another embodiment, in the transverse direction, the Elmendorf Tear Strength of the synthetic paper of the present invention is about 85 percent to about 45 percent of the Elmendorf Tear Strength of virgin LLDPE film. In yet another embodiment, in the transverse direction, the Elmendorf Tear Strength of the synthetic paper of the present invention is about 55 percent to about 45 percent of the Elmendorf Tear Strength of virgin LLDPE film. In another embodiment, in the machine direction, the Elmendorf Tear Strength of the synthetic paper of the present invention is about 90 percent to about 45 percent in the machine direction of the Elmendorf Tear Strength of virgin LLDPE film. In still another embodiment, in the machine direction, the Elmendorf Tear Strength of the synthetic paper of the present invention is about 65 percent to about 45 percent of the Elmendorf Tear Strength of virgin LLDPE film. In yet another embodiment, in the machine direction, the Elmendorf Tear Strength of the synthetic paper of the present invention is about 55 percent to about 45 percent of the Elmendorf Tear Strength of virgin LLDPE film.

When compared to virgin LDPE film, the synthetic paper of the present invention, when formed from a resin film including LDPE and a tear additive, may have a drop in Elmendorf Tear Strength of at least about 35 percent in the transverse direction and at least about 10 percent in the machine direction. In one embodiment, in the transverse direction, the Elmendorf Tear Strength of the synthetic paper of the present invention is about 65 percent to about 20 percent of the Elmendorf Tear Strength of virgin LDPE film. In another embodiment, in the transverse direction, the Elmendorf Tear Strength of the synthetic paper of the present invention is about 50 percent to about 20 percent of the Elmendorf Tear Strength of virgin LDPE film. In yet another embodiment, in the transverse direction, the Elmendorf Tear Strength of the synthetic paper of the present invention is about 25 percent to about 20 percent of the Elmendorf Tear Strength of virgin LDPE film. In another embodiment, in the machine direction, the Elmendorf Tear Strength of the synthetic paper of the present invention is about 90 percent to about 50 percent of the Elmendorf Tear Strength of virgin LDPE film. In still another embodiment, in the machine direction, the Elmendorf Tear Strength of the synthetic paper of the present invention is about 70 percent to about 50 percent of the Elmendorf Tear Strength of virgin LDPE film. In yet another embodiment, the Elmendorf Tear Strength of the synthetic paper of the present invention is about 60 percent to about 50 percent of the Elmendorf Tear Strength of virgin LDPE film.

When compared to virgin LDPE film, the synthetic paper of the present invention, when formed from a resin film including LDPE, a low aspect ratio filler, and a tear additive, may have a drop in Elmendorf Tear Strength of at least about 15 percent in the transverse direction. In one embodiment, in the transverse direction, the Elmendorf Tear Strength of the synthetic paper of the present invention is about 85 percent to about 15 percent of the Elmendorf Tear Strength of virgin LDPE film. In another embodiment, in the transverse direction, the Elmendorf Tear Strength of the synthetic paper of the present invention is about 82 percent to about 15 percent of the Elmendorf Tear Strength of virgin LDPE film. In yet another embodiment, in the transverse direction, the Elmendorf Tear Strength of the synthetic paper of the present invention is about 25 percent to about 15 percent of the Elmendorf Tear Strength of virgin LDPE film. In another embodiment, in the machine direction, the Elmendorf Tear Strength of the synthetic paper of the present invention is about 100 percent to about 20 percent of the Elmendorf Tear Strength of virgin LDPE film. In still another embodiment, in the machine direction, the Elmendorf Tear Strength of the synthetic paper of the present invention is about 45 percent to about 20 percent of the Elmendorf Tear Strength of virgin LDPE film. In yet another embodiment, the Elmendorf Tear Strength of the synthetic paper of the present invention is about 30 percent to about 20 percent of the Elmendorf Tear Strength of virgin LDPE film.

When compared to virgin HDPE film, the synthetic paper of the present invention, when formed from a resin film including HDPE, a low aspect ratio filler, and a tear additive, may have a drop in Elmendorf Tear Strength of at least about 5 percent in the machine direction. In one embodiment, in the transverse direction, the Elmendorf Tear Strength of the synthetic paper of the present invention is about 100 percent to about 60 percent of the Elmendorf Tear Strength of virgin HDPE film. In another embodiment, in the transverse direction, the Elmendorf Tear Strength of the synthetic paper of the present invention is about 80 percent to about 60 percent of the Elmendorf Tear Strength of virgin HDPE film. In yet another embodiment, in the transverse direction, the Elmendorf Tear Strength of the synthetic paper of the present invention is about 75 percent to about 65 percent of the Elmendorf Tear Strength of virgin HDPE film. In another embodiment, in the machine direction, the Elmendorf Tear Strength of the synthetic paper of the present invention is about 95 percent to about 70 percent of the Elmendorf Tear Strength of virgin HDPE film. In still another embodiment, in the machine direction, the Elmendorf Tear Strength of the synthetic paper of the present invention is about 85 percent to about 70 percent of the Elmendorf Tear Strength of virgin HDPE film. In yet another embodiment, the Elmendorf Tear Strength of the synthetic paper of the present invention is about 80 percent to about 70 percent of the Elmendorf Tear Strength of virgin LDPE film.

In addition, tearing the synthetic papers of the present invention occurs with less noise. In one embodiment, tearing the synthetic paper of the present invention is at least 20 percent quieter than tearing copy or bond paper. As a result, the synthetic papers of the present invention are useful for packaging in movie theaters, public rest rooms, and the like.

Barrier Properties

The synthetic paper of the present invention has superior water, oil, and grease resistance. Another significant advantage of the synthetic papers of the present invention is the improved oxygen and moisture barrier properties. The synthetic papers of the present invention provide about 30 to about 60 percent improvement in oxygen barrier and up to about 40 percent improvement in moisture barrier properties relative to uncoated packaging material. In other words, the synthetic papers of the present invention have a similar MVTR value to that of waxed paper.

The moisture vapor transmission of a synthetic paper of the present invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential.

TABLE 1

| Material | MVTR g/m$^2$ |
|---|---|
| Polyester Film | less than 0.01 |
| Aluminum Foil | |
| LDPE Film Laminates | |
| Polyester Film (12 Micron) | 40 |
| LDPE Film | 18 |
| Synthetic Paper of Present Invention | less than 1 |

MVTR: Moisture Vapor Transmission Rate g/m$^2$ over a period of 24 hours at 38° C. and 90 percent relative humidity.

Weight changes of synthetic paper monitored over a period of seven weeks in 100 percent relative humidity and 72° F. help to demonstrate that the synthetic papers of the present invention have comparable water resistance to conventional wax paper. In one embodiment, the synthetic papers of the present invention have a weight gain of about 0.15 grams or less after seven weeks. In another embodiment, the synthetic papers of the present invention have a weight gain of about 0.13 grams or less after a seven-week storage period. In still another embodiment, the weight gain of the synthetic papers of the present invention is about 0.09 grams or less after seven weeks. In yet another embodiment, the weight gain is about 0.06 grams or less after a seven-week period. The synthetic papers of the present invention preferably have a weight gain of about 0.03 grams or less over a seven-week storage period.

Opacity

The synthetic papers of the present invention may be about 50 to about 95 percent opaque. In one embodiment, the opacity of the synthetic paper of the present invention is about 60 percent to about 95 percent. In still another embodiment, the synthetic papers of the present invention may be about 70 to about 85 percent opaque.

Recyclability

As mentioned above, recycled or biodegradable polyolefins may be used in the compositions that form the resin films. Thus, it is contemplated that the synthetic papers of the present invention may be formulated to be completely recyclable.

The papers manufactured according to the present invention can be applied to the field of printing, packaging, and decoration. For example, the synthetic papers of the present invention may be used in food, deli, and meat wrap, bakery packaging, chewing gum packaging, condiment/sweetener packets, personal care packets, snack bag pouches, gift wrap, floral wrap, craft application, concrete bags, and merchandise bags. In fact, the synthetic paper of the present invention reduces or eliminates grease stains as compared to conventional paper food wraps and prevents the migration of chemicals and waxes into foods.

EXAMPLES

The following non-limiting examples are merely illustrative of preferred embodiments of the present invention, and are not to be construed as limiting the invention, the scope of which is defined by the appended claims.

Example 1: Composition Including Polyolefin Resin and Low Aspect Ratio Filler Compositions of the invention including a polyolefin resin and a low ratio aspect filler were formed as shown in Table 2 below:

TABLE 2

Resin Film Compositions

| Component | A | B | C | D | E | F |
|---|---|---|---|---|---|---|
| LDPE | 50 | 50 | 50 | 50 | 50 | 50 |
| 103805[1] | 30 | | | 40 | | |
| LR-241679[2] | | 30 | | | 40 | |
| LR-241680[3] | | | 30 | | | 40 |

[1]103805 is calcium carbonate with an average particle size
[2]LR-241679 is calcium carbonate with an average particle size of 12 μm.
[3]LR-241680 is calcium carbonate with an average particle size of 17 μm.

As shown in Table 3, when compositions A-F were tested in the machine direction (MD) and transverse direction (TD), the lower particle size in the low aspect ratio filler produced the highest percent elongation and tensile strength.

TABLE 3

Properties of Compositions of Invention

| Composition | Tensile Strength (psi) | | Elongation (%) | | Elmendorf Tear (mN) | | Drop (J) | | Drop Type of Break | |
|---|---|---|---|---|---|---|---|---|---|---|
| | MD | TD | MD | TD | MD | TD | MD | TD | MD | TD |
| A | 2265.0 | 2355.0 | 271.9 | 420.3 | 1105.2 | 2115.3 | 1.16 | | Hole | |
| B | 2273.6 | 2569.6 | 322.8 | 464.0 | 1302.3 | 2237.9 | 1.26 | | Hole | |
| C | 2187.4 | 2286.7 | 258.1 | 418.2 | 1142.5 | 2103.5 | 1.22 | | Hole | |
| D | 2024.9 | 2176.1 | 236.3 | 412.8 | 1109.1 | 2208.5 | 1.14 | | Hole | |
| E | 2402.3 | 2451.3 | 320.0 | 444.1 | 1155.2 | 2104.5 | 1.18 | | Hole | |
| F | 2161.9 | 2226.4 | 253.8 | 417.5 | 1131.7 | 2114.3 | 1.15 | | Hole | |

In addition, there are not significant differences in the tested properties between compositions A and C or D and F in the machine or transverse directions.

Example 2: Composition Including Polyolefin Resin and Tear Additive

Compositions of the invention including different types of polyolefin resin and varying amounts of tear additive were used to form resin films according to the present invention. In each case, the polyolefin resin was used in an amount of 50 percent to 55 percent by weight of the composition.

Figure 3A:
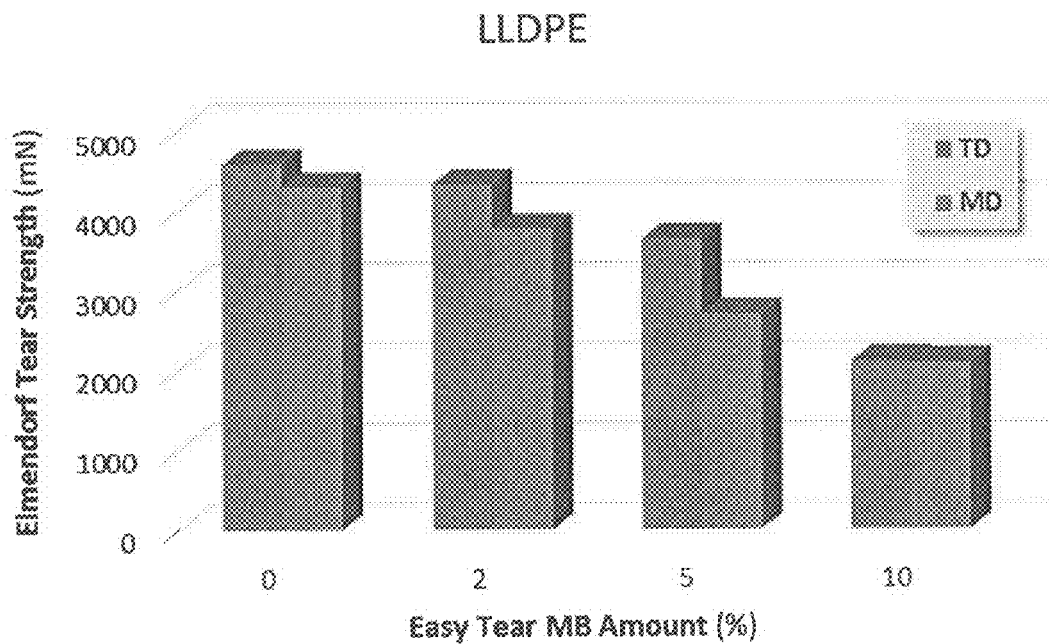
FIGS. 3A-3C are graphical illustrations of the tear properties of synthetic paper made according to embodiments of the invention.

FIG. 3A shows the effects of the tear additive in varying amounts on LLDPE film. In particular, at two percent loading of the tear additive, there was a 5 percent drop in Elmendorf tear strength in the machine direction and a 12 percent drop in the Elmendorf tear strength in the transverse direction. At five percent loading of the tear additive, there was a 19 percent drop in Elmendorf tear strength in the machine direction and a 39 percent drop in the Elmendorf tear strength in the transverse direction. At ten percent loading of the tear additive, there was a 53 percent drop in Elmendorf tear strength in the machine direction and a 51 percent drop in the Elmendorf tear strength in the transverse direction.

Figure 3B:
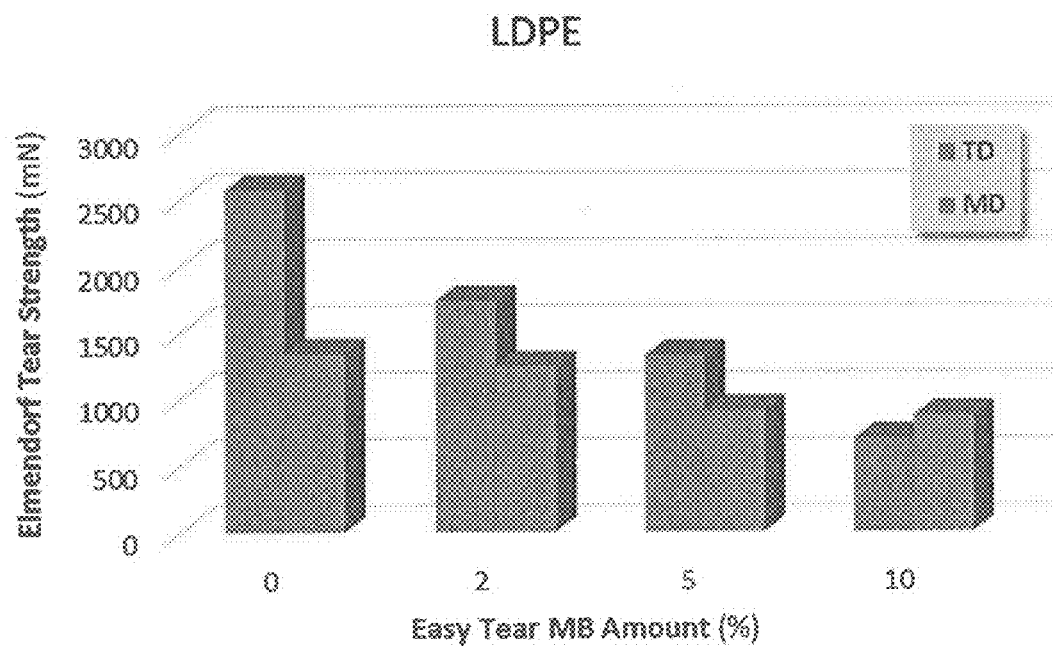

FIG. 3B shows the effects of the tear additive in varying amounts on LDPE film. In particular, at two percent loading of the tear additive, there was a 36 percent drop in Elmendorf tear strength in the machine direction and a 12 percent drop in the Elmendorf tear strength in the transverse direction. At five percent loading of the tear additive, there was a 52 percent drop in Elmendorf tear strength in the machine direction and a 36 percent drop in the Elmendorf tear strength in the transverse direction. At ten percent loading of the tear additive, there was a 78 percent drop in Elmendorf tear strength in the machine direction and a 44 percent drop in the Elmendorf tear strength in the transverse direction.

Figure 3C:
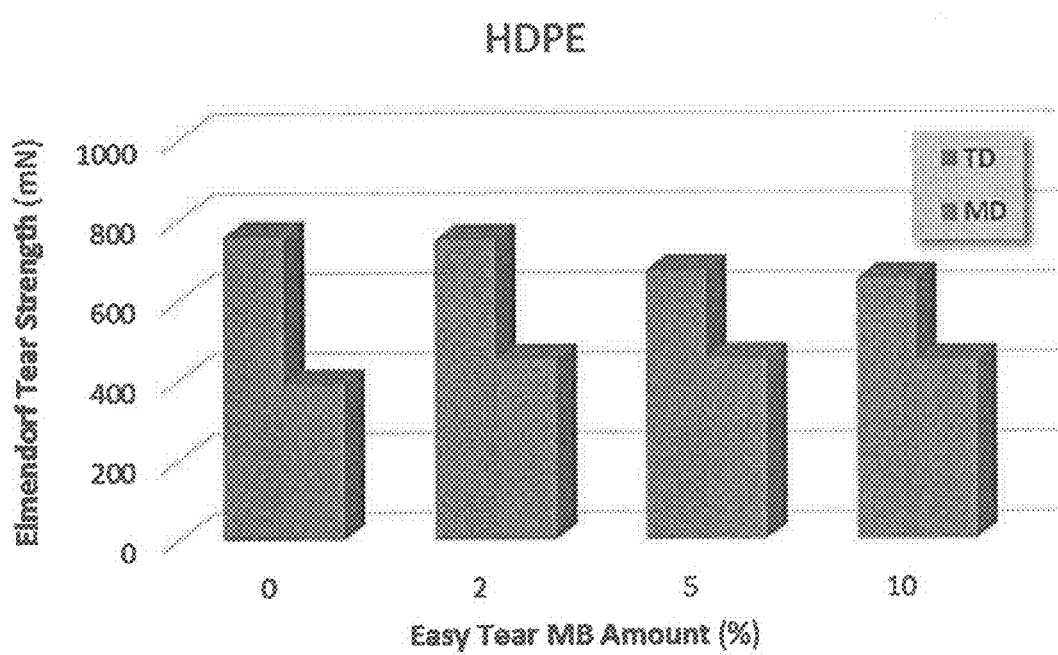

FIG. 3C shows the effects of the tear additive in varying amounts on HDPE film. In particular, at five percent loading of the tear additive, there was a 7 percent drop in Elmendorf tear strength in the machine direction and no drop in the Elmendorf tear strength in the transverse direction. At ten percent loading of the tear additive, there was a 8 percent drop in Elmendorf tear strength in the machine direction and no drop in the Elmendorf tear strength in the transverse direction. There was no effect on the Elmendorf tear strength in either the machine direction or transverse direction at 2 percent loading.

Example 3: Composition Including Low Density Polyolefin, Low Aspect Ratio Filler, Tear Additive, and Color Additive Compositions of the invention including polyolefin resin, a color additive, varying amounts of tear additive, and low ratio aspect filler were used to form resin films according to the present invention. In each case, the polyolefin resin was LDPE, which was included in an amount of 40 percent by weight of the composition, the color additive was brown masterbatch, which was included in an amount of 10 percent by weight of the composition, and the low aspect ratio filler was calcium carbonate with an average particle size of 21 μm, which was included in an amount of 40 percent by weight of the composition.

Figure 4:
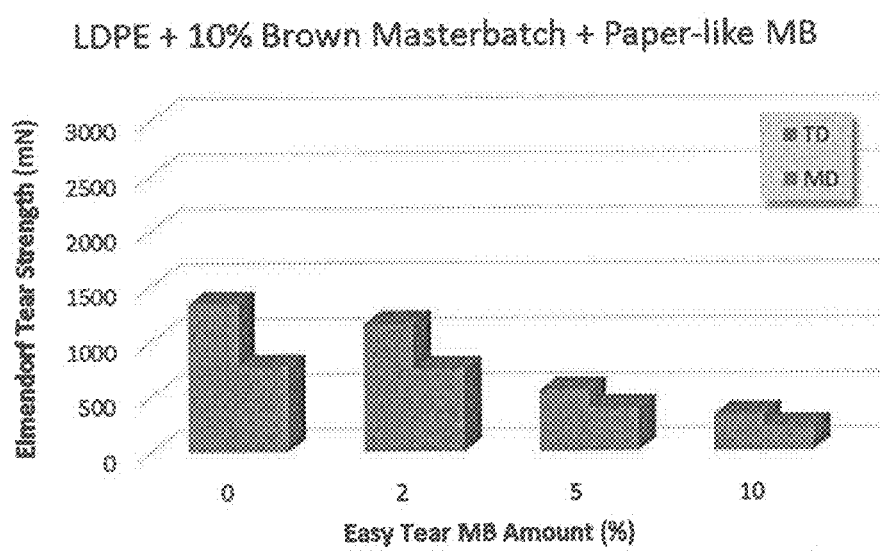
FIG. 4 is a graphical illustration of the tear properties of synthetic paper made according to other embodiments of the invention.

FIG. 4 shows the effects of the tear additive. In particular, at two percent loading of the tear additive, there was a 16 percent drop in Elmendorf tear strength in the machine direction and no drop in the Elmendorf tear strength in the transverse direction. At five percent loading of the tear additive, there was a 19 percent drop in Elmendorf tear strength in the machine direction and a 60 percent drop in the Elmendorf tear strength in the transverse direction. At ten percent loading of the tear additive, there was a 80 percent drop in Elmendorf tear strength in the machine direction and a 75 percent drop in the Elmendorf tear strength in the transverse direction.

In comparing FIG. 3B with FIG. 4, the testing shows that a composition that includes LDPE, a low aspect ratio filler, and the tear additive forms a resin film that has superior tear properties over that of a composition that includes only LDPE and the tear additive.

Example 4: Composition Including High Density Polyolefin, Low Aspect Ratio Filler, and Tear Additive Compositions of the invention including polyolefin resin, varying amounts of tear additive, and low ratio aspect filler were used to form resin films according to the present invention. In each case, the polyolefin resin was HDPE, which was included in an amount of 40 percent by weight of the composition and the low aspect ratio filler was calcium carbonate with an average particle size of 21 μm, which was included in an amount of 40 percent by weight of the composition. The control included only HDPE, but no low aspect ratio filler.

Figure 5A:
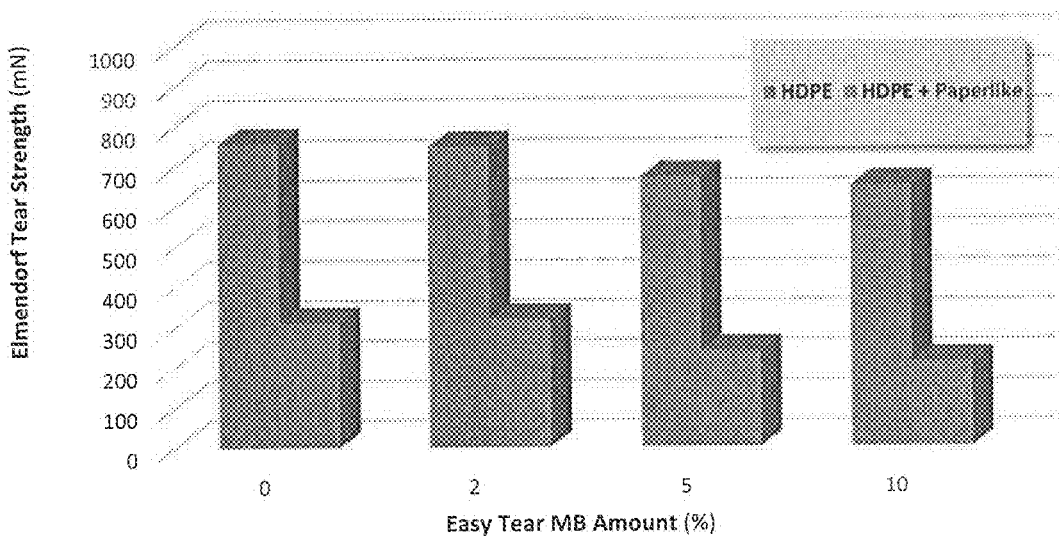
FIGS. 5A-5B are graphical illustrations of the tear properties of synthetic paper made according to other embodiments of the invention.
Figure 5B:
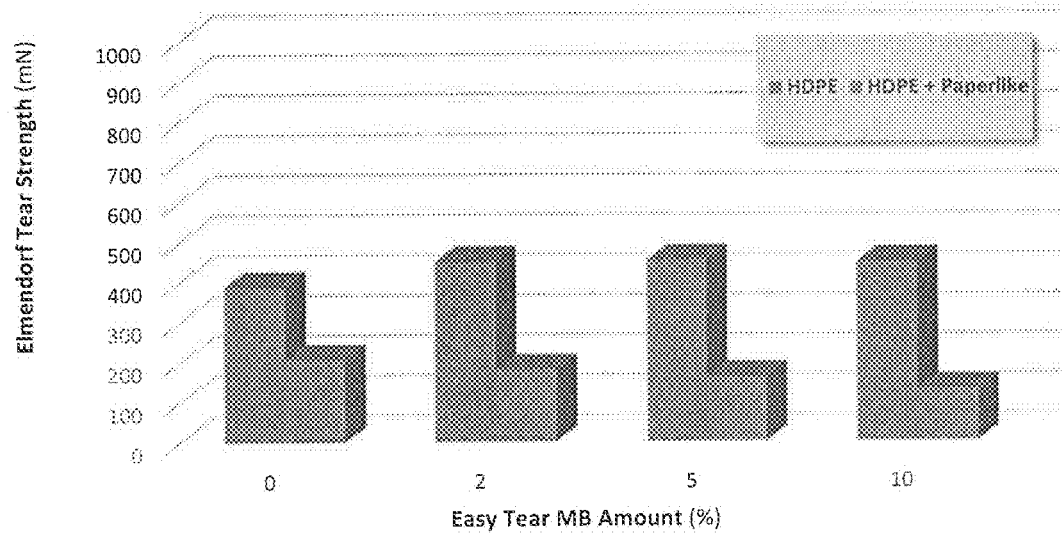

FIGS. 5A and 5B show that the results obtained in Example 3 with LDPE are not realized with HDPE. In particular, at two percent loading of the tear additive, there was a 10 percent drop in Elmendorf tear strength in the machine direction and no drop in the Elmendorf tear strength in the transverse direction. At five percent loading of the tear additive, there was a percent drop in Elmendorf tear strength in the machine direction and a 28 percent drop in the Elmendorf tear strength in the transverse direction. At ten percent loading of the tear additive, there was a 25 percent drop in Elmendorf tear strength in the machine direction and a 30 percent drop in the Elmendorf tear strength in the transverse direction.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A synthetic paper including one or more resin layers formed from a composition comprising:
   a high density polyethylene resin present in an amount of about 40 percent to about 60 percent by weight of the composition;
   a particulate filler having a mean particle size of about 10 μm to about 30 μm; and
   a cyclic olefin copolymer produced by copolymerization of ethylene with at least one cyclic olefin monomer, the at least one cyclic olefin monomer comprises at least one of: cyclopentadiene, a cyclopentadiene derivative, dicyclopentadiene, a dicyclopentadiene derivative, norbornene, dihydrodicyclopentadiene, phenyl norbornene, and tetracyclododecene, or a combination thereof,
   wherein the synthetic paper has a dead fold angle of about 20° to about 30° and an Elmendorf tear strength of about 100 mN to about 1000 mN in a transverse direction.

2. The synthetic paper of claim 1, wherein the particulate filler is present in the composition in an amount of 10% to 40% by weight of the composition.

3. The synthetic paper of claim 1, wherein the particulate filler comprises calcium carbonate.

4. The synthetic paper of claim 1, wherein the synthetic paper comprises at least two resin layers.

5. The synthetic paper of claim 4, wherein the at least two resin layers comprise a first resin layer and a second resin layer, wherein a polyolefin resin in the first resin layer is different from a polyolefin resin in the second resin layer.

6. The synthetic paper of claim 1, wherein the synthetic paper comprises at least three resin layers.

7. The synthetic paper of claim 1, having a thickness of about 0.5 mils to about 4 mils.

8. The synthetic paper of claim 1, wherein the cyclic olefin copolymer is present in an amount of about 2 percent to about 10 percent by weight of the composition.

9. The synthetic paper of claim 1, wherein the synthetic paper has an Elmendorf tear strength of about 50 mN to about 750 mN in a machine direction.

10. The synthetic paper of claim 1, wherein the synthetic paper has a moisture vapor transmission rate (MVTR) of less than 1 $g/m^2$, as measured over a twenty-four-hour period at approximately 38° C. and approximately 90% relative humidity.

11. The synthetic paper of claim 1, wherein the synthetic paper is 50% to 95% opaque.

* * * * *